Patented Nov. 6, 1923.

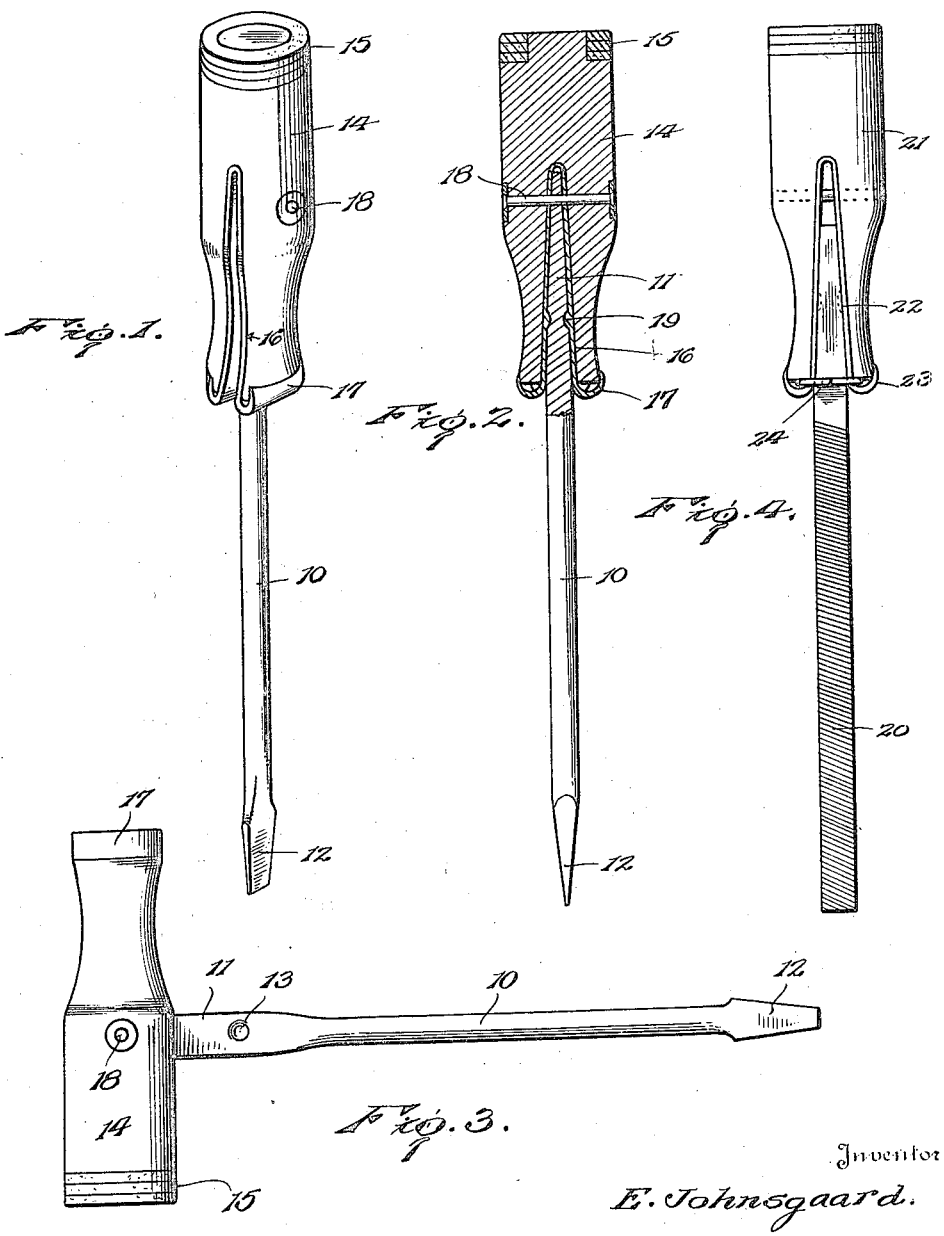

1,473,186

UNITED STATES PATENT OFFICE.

EMIL JOHNSGAARD, OF FAIRVIEW, MONTANA.

COMBINATION TOOL.

Application filed April 18, 1922. Serial No. 554,914.

*To all whom it may concern:*

Be it known that I, EMIL JOHNSGAARD, a citizen of the United States, residing at Fairview, in the county of Richland and State of Montana, have invented certain new and useful Improvements in Combination Tools, of which the following is a specification.

This invention relates to an improved compound tool and seeks, as one of its principal objects, to provide a tool employing a tool shank having a handle thereon normally alining with the shank and wherein the handle may be turned to a position at right angles to the shank to form a mallet.

The invention has as a further object to provide a tool wherein the handle will normally be yieldably locked in alinement with the tool shank.

And the invention has as a still further object to provide a tool wherein the handle will be equipped with a V-shaped strip constituting a pair of jaws to coact with the shank and wherein the handle will be of such type that various tools may be employed in connection therewith.

Other and incidental objects will appear hereinafter.

In the drawing:

Figure 1 is a perspective view of my improved tool,

Fig. 2 is a sectional view through the device,

Fig. 3 is a side elevation showing the handle of the tool disposed to form a mallet, and Fig. 4 is an elevation of a slightly modified form of tool.

In carrying the invention into effect, I employ a tool shank 10 provided with a tapered inner end 11 while at its outer end the shank is preferably formed with a screwdriver bit 12. The tapered inner end of the shank is formed with flat sides in which are provided sockets 13 and mounted upon the shank is a handle 14. This handle may be formed of wood or other approved material and is reduced at its inner end portion while upon the outer end of the handle are mounted a plurality of reinforcing rings 15 of leather or other approved material. However, if preferred, a metal ferrule may be substituted in lieu of the rings. Formed in the handle from the smaller end thereof is a longitudinally directed V-shaped kerf and snugly fitting in said kerf is a resilient V-shaped strip constituting a pair of jaws 16, the strip being preferably of steel. The jaws diverge toward the inner end of the handle and, at their extremities, are bent laterally in opposite directions to form loops 17 engaging over the ends of the portions of the handle at opposite sides of the kerf therein. As shown in Fig. 2, the tapered inner end 11 of the tool shank 10 snugly fits between the jaws and extending through the inner end of said shank, through the jaws, and through the handle, is a rivet or other suitable fastening device 18, pivotally connecting the handle with the shank and holding the jaws against displacement. Formed on the jaws are knobs 19 normally engaging in the sockets 13 of the shank, locking the handle in alinement with the shank. If found more feasible, the tool shank may be provided with the knobs and the jaws with the sockets.

As will now be readily understood in view of the preceding description, the jaws 16 will resiliently grip the tool shank 10 for maintaining the handle locked in alinement with the shank as well as preventing any looseness between the handle and the shank. Accordingly, the tool will provide an efficient screw-driver and, if desired, the handle may, as shown in Fig. 3, be rocked to a position extending at right angles to the shank so as to obtain a greater leverage upon the shank. Moreover, when the handle is thus disposed the tool is converted into a mallet, the handle then providing a mallet head and the shank a handle for the head. In this position of the handle 14, the jaws 16 will grip the end of the shank 10 for frictionally holding the handle against individual movement upon the shank so that the tool may be readily employed as a mallet.

In Fig. 4 of the drawing, I have illustrated the manner in which the handle herein shown may be employed in connection with other tools such, for instance, as a file, as conventionally illustrated at 20. The handle is indicated at 21, the jaws therein at 22, and the loops at the free ends of the jaws at 23. When the handle is so used, I preferably connect the jaws by a link 24 threaded through the loops 23, the link being designed to prevent undue spreading of the jaws. As illustrated, the tapered inner end of the file is driven between the jaws for connecting the handle with the file, the jaws being thus caused to grip the inner end of the file for firmly securing the handle thereon. Thus, the handle may be readily attached to or detached from the file; and, as will be appreciated, the handle may, in like manner, be connected with various other tools.

Having thus described the invention, what is claimed as new is:

1. A tool of the character described including a tool shank having a tapered inner end, a handle pivotally mounted upon the inner end of the shank, and a V-shaped strip carried by the handle to form coacting jaws straddling the tapered inner end of the shank longitudinally thereof and gripping the shank for normally holding the handle in alinement with the shank.

2. In a device of the character described, a tool handle including a body, and a resilient V-shaped strip embedded in the handle forming a pair of coacting jaws to straddle the tapered end of a tool wedged between the jaws.

3. In a device of the character described, a tool handle including a body having a longitudinally directed kerf therein, and a resilient V-shaped strip seated in said kerf and having the sides thereof forming a pair of coacting diverging jaws to straddle the tapered end of a tool wedged between the jaws.

4. In a device of the character described, a tool handle including a body having a longitudinally directed kerf therein, a resilient V-shaped strip seated in said kerf and having the sides thereof forming a pair of coacting diverging jaws to straddle the tapered end of a tool wedged between the jaws, and means extending between the free end portions of the jaws and connecting said end portions of the jaws with each other limiting the free ends of the jaws against spreading.

In testimony whereof I affix my signature.

EMIL JOHNSGAARD. [L. s.]